United States Patent
Ishikawa

(10) Patent No.: US 7,616,823 B2
(45) Date of Patent: Nov. 10, 2009

(54) IMAGE PROCESSING METHOD AND IMAGE PROCESSING APPARATUS

(75) Inventor: Tomoe Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 10/867,696

(22) Filed: Jun. 16, 2004

(65) Prior Publication Data

US 2005/0021816 A1    Jan. 27, 2005

(30) Foreign Application Priority Data

Jun. 20, 2003    (JP)    ............................. 2003-176929

(51) Int. Cl.
- G06K 9/36 (2006.01)
- G06K 9/46 (2006.01)
- H04B 1/66 (2006.01)
- H04N 11/02 (2006.01)
- H04N 11/04 (2006.01)
- H04N 7/12 (2006.01)

(52) U.S. Cl. ................ 382/240; 382/226; 341/79; 375/240

(58) Field of Classification Search .............. 382/232, 382/240; 709/247, 232; 375/240.19
See application file for complete search history.

(56) References Cited

U.S. PATENT DOCUMENTS 7,206,804 B1* 4/2007 Deshpande et al. ......... 709/203
2003/0067627 A1* 4/2003 Ishikawa et al. ........... 358/1.15
2003/0118107 A1* 6/2003 Itakura et al. .......... 375/240.19
2005/0163388 A1* 7/2005 Schwartz et al. ........... 382/232
2007/0206592 A1 9/2007 Itakura et al. ............... 370/389

FOREIGN PATENT DOCUMENTS

| JP | 2000-354058 | 12/2000 |
|---|---|---|
| JP | 2002-49514 A | 2/2002 |
| JP | 2003-152544 | 5/2003 |
| JP | 2003-169216 | 6/2003 |

OTHER PUBLICATIONS

Japanese Official Communicated dated Nov. 16, 2007, regarding Application No. 2003-176929.
Japanese Official Communicated dated Feb. 5, 2008, regarding Application No. 2003-176929.

* cited by examiner

*Primary Examiner*—Brian P Werner
*Assistant Examiner*—Randolph Chu
(74) *Attorney, Agent, or Firm*—Fitzpatrick, Cella, Harper & Scinto

(57) ABSTRACT

Information associated with data which was previously transmitted to a client terminal (201 or 202) is recorded as a history. When a transmission request of data of logical units in tiles required to obtain a desired image is received from the client terminal (201), the type of progression order used in the client terminal (201) is discriminated with reference to the history. The transmission order of the data of the logical units in the tiles to be transmitted to the client terminal (201) is determined in accordance with the discrimination order, and the data of the logical units in the tiles are transmitted to the client terminal (201) in accordance with the determined transmission order.

4 Claims, 16 Drawing Sheets

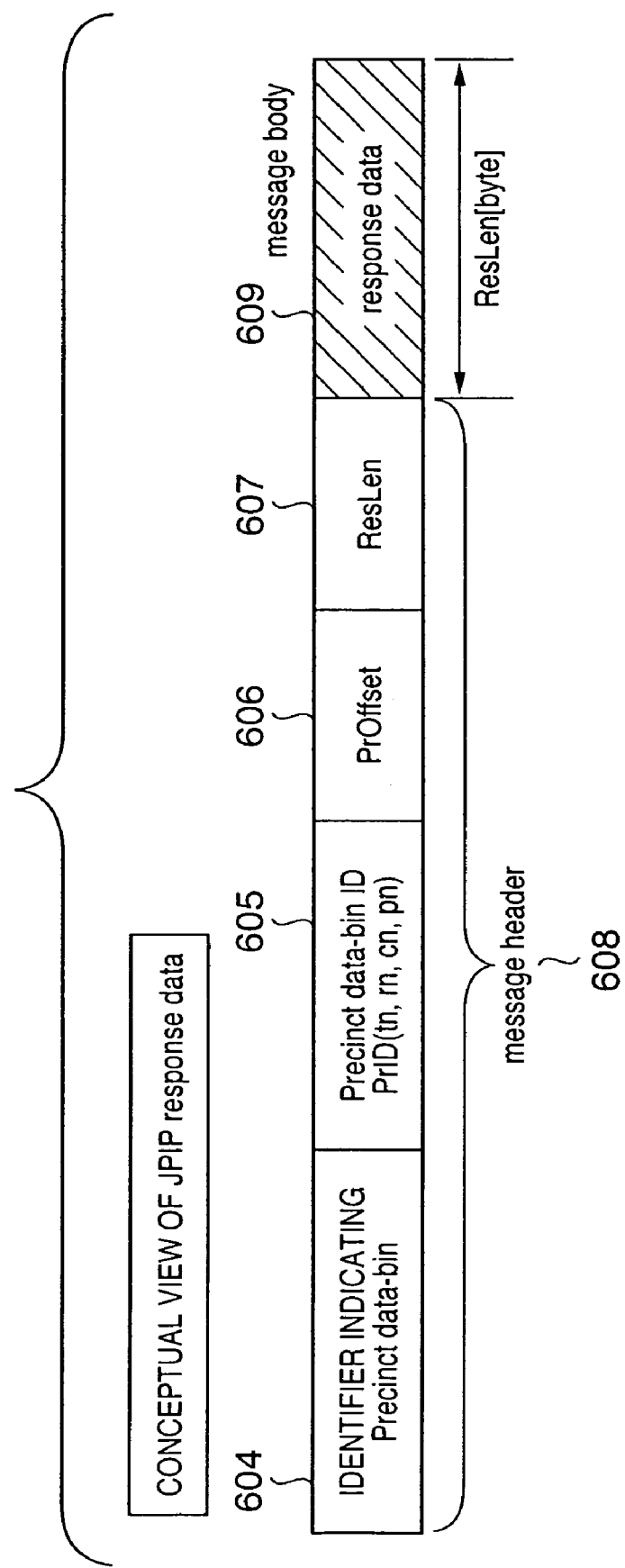

IMAGE PROCESSING METHOD AND IMAGE PROCESSING APPARATUS

FIELD OF THE INVENTION

The present invention relates to a technique for holding encoded image data, which is segmented into tiles each including a plurality of logic units, and has a format that allows a plurality of types of different orders of logical units to be arranged, and transmitting data of a logical unit designated by a request from an external apparatus in a tile designated by that request to the external apparatus.

BACKGROUND OF THE INVENTION

On the Internet, users actively access WWW servers from Web browsers, which are running on client terminals, to browse document data, image data, and the like on the client terminal side via the Web browsers. Each WWW server saves a document called a home page, which is prepared by describing information to be disclosed in HTML. The Web browser on the client terminal side accesses such home page and displays it on the display screen of a display device of the client terminal. Also, when the user designates a link in the home page displayed on the display device, the Web browser on the client terminal side can acquire required information by tracing a link destination indicated by the link.

Furthermore, as a method of downloading files managed by the WWW server, a method called "File Transfer Protocol" (to be abbreviated as "FTP" hereinafter) is known. The FTP is a scheme for transferring the contents of a file on the WWW server to the client computer at a time via a network.

As a protocol for fragmentarily accessing and displaying an image data file, Flashpix/IIP is known. This Internet imaging protocol (IIP) is optimal to the image data file format "Flashpix", and makes partial access to image data for respective tiles of Flashpix. Some conventional techniques that use this IIP protocol have been disclosed (for example, see Japanese Patent Laid-Open No. 2002-49514).

With any of these protocols, data to be transmitted from the server are independent encoded data. For this reason, the server need not return data in consideration of the order of transmission data.

As a protocol for fragmentarily accessing and displaying a file encoded according to JPEG2000, JPEG2000 image coding system—Part 9: Interactivity tools, APIs and Protocols (to be abbreviated as JPIP hereinafter) has been examined. When JPEG2000 image data is fragmentarily transmitted to the client terminal using such protocol, the client terminal must cache received fragmentary encoded data in one file so as to decode the transmitted image data. This is because encoded data of each layer/level of JPEG2000 is difference data from data one layer/level lower than that layer/level.

The client that requests data using this JPIP can use the following two different requests in association with a return method of response data.

1) fullwindow: leaves the transmission order of response data to server's discretion, but requests to surely return all request data 2) progressive: allows to delete some request data, but requests to return data in the order of scalability in the image quality direction (layer progression order)

Therefore, when the client wants to surely receive all requested data, it issues the fullwindow request. Hence, the server returns data according to the server's implementation policy regardless of the process on the client side.

As described above, since the server returns JPEG2000 fragmentary data regardless of the order of transmission data, these data must be rearranged depending on the received data management method on the client terminal side.

When an image display application used on the client terminal side uses scalability in the resolution direction, and reads out received data in an order along the JPEG2000 bitstream syntax upon decoding, the received data must be managed after they are rearranged to be suited to display using resolution scalability, or data must be rearranged and read out.

In this way, rearranging received data upon management imposes a heavy load on the client terminal when received data are processed, and a long processing time is required every time the client terminal communicates with the server. When data are read out while being rearranged in a read order upon decoding, random access to saved data frequently occurs every time an image is displayed using already saved data, thus prolonging a time required until decoding, even when no communication is made.

SUMMARY OF THE INVENTION

The present invention has been made in consideration of the aforementioned problems, and has as its object to supply data to an apparatus which requests fragmentary data of encoded image data in an order suitable for a progression order used by that apparatus, and to shorten the time required for the apparatus to decode the data.

In order to achieve the above object, for example, an image processing method of the present invention comprises the following arrangement.

That is, an image processing method to be executed by an image processing apparatus that holds encoded image data, which is segmented into tiles each including a plurality of logic units, and has a format that allows a plurality of types of different orders of logical units to be arranged, and transmits data of a logical unit designated by a request from an external apparatus in a tile designated by that request to the external apparatus, comprises:

a history holding step of recording information associated with data which was previously transmitted to the external apparatus as a history, and holding the history in a predetermined memory;

a transmission order determination step of discriminating, when a transmission request of data of logical units in tiles required to obtain a desired image of the held encoded image data is received from the external apparatus, a type of progression order used on the external apparatus side with reference to the history held in the history holding step, and determining a transmission order of the data of the logical units in the tiles to be transmitted to the external apparatus in accordance with the discrimination result; and a transmission step of transmitting the data of the logical units in the tiles corresponding to the transmission request to the external apparatus in accordance with the transmission order determined in the transmission order determination step.

In order to achieve the above object, for example, an image processing apparatus of the present invention comprises the following arrangement.

That is, an image processing apparatus that holds encoded image data, which is segmented into tiles each including a plurality of logic units, and has a format that allows a plurality of types of different orders of logical units to be arranged, and transmits data of a logical unit designated by a request from an external apparatus in a tile designated by that request to the external apparatus, comprises:

history holding means for recording information associated with data which was previously transmitted to the external apparatus as a history, and holding the history;

transmission order determination means for, when a transmission request of data of logical units in tiles required to obtain a desired image of the held encoded image data is received from the external apparatus, discriminating a type of progression order used on the external apparatus side with reference to the history held by said history holding means, and determining a transmission order of the data of the logical units in the tiles to be transmitted to the external apparatus in accordance with the discrimination result; and transmission means for transmitting the data of the logical units in the tiles corresponding to the transmission request to the external apparatus in accordance with the transmission order determined by said transmission order determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the basic arrangement of an image processing apparatus according to the first embodiment of the present invention, which comprises a PC (personal computer), workstation, or the like;

FIG. 6B shows the configuration of JPIP response data formed using the precinct data-bin shown in FIG. 6A;

DETAILED DESCRIPTION OF THE PREFERRED EMBODIMENTS

Preferred embodiments of the present invention will now be described in detail in accordance with the accompanying drawings.

First Embodiment

Figure 1:
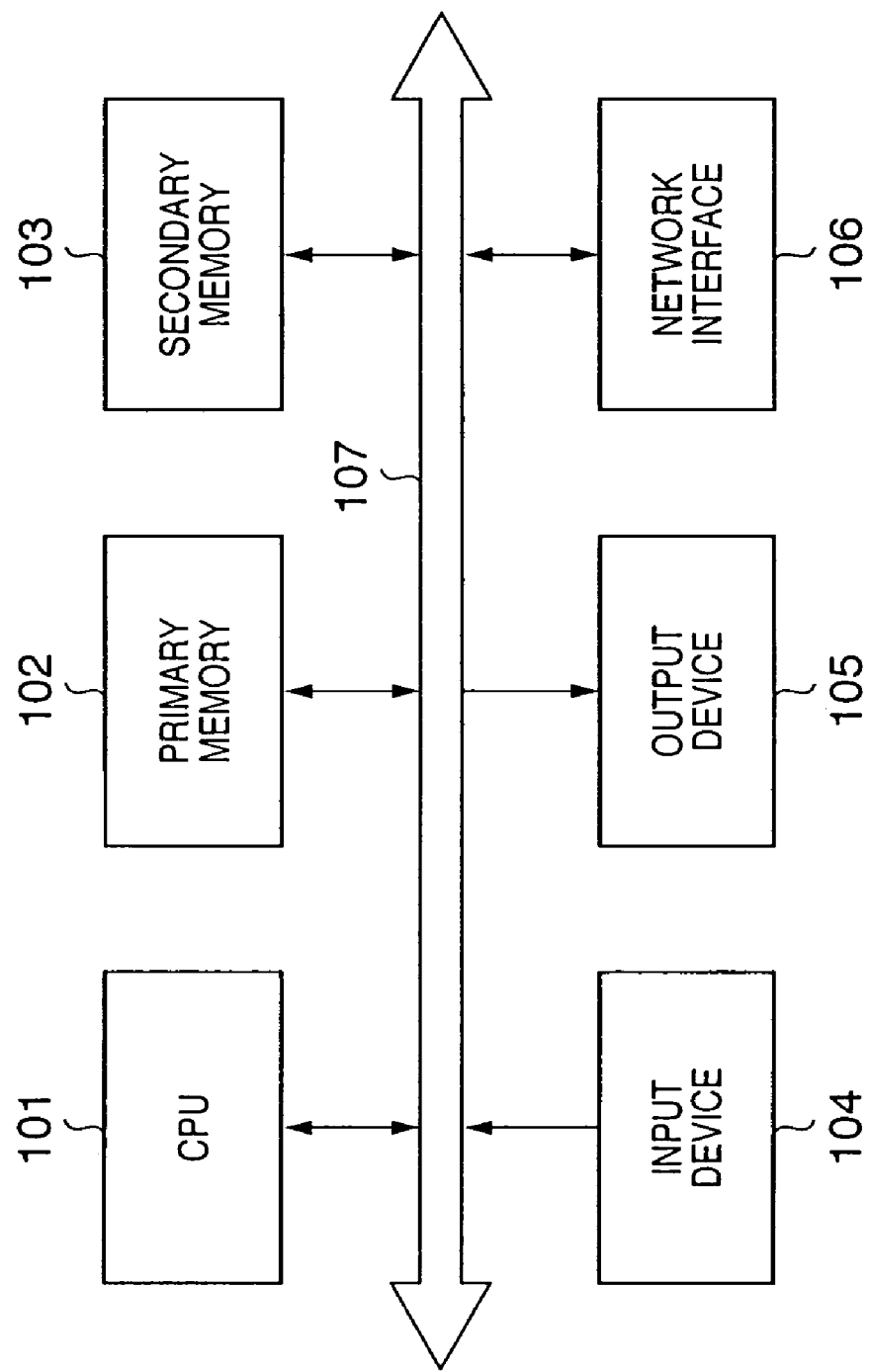

FIG. 1 is a block diagram showing the basic arrangement of an image processing apparatus according to this embodiment, which comprises a PC (personal computer), workstation, or the like.

A CPU 101 controls the operation of the overall apparatus and the operations of respective units to be described later using programs and data loaded onto a primary memory 102.

The primary memory 102 is a main storage device represented by a RAM, and has an area for temporarily storing programs and data loaded from a secondary memory 103, and also an area used by the CPU 101 to execute various processes.

The secondary memory 103 is an information storage device which is represented by a hard disk drive and has a large storage capacity, and can save an OS (operating system), and programs and data required for the CPU 101 to execute respective processes to be described later. The secondary memory 103 outputs (loads) a requested program and data to the primary memory 102 under the control of the CPU 101.

An input device 104 is an instruction input device represented by, e.g., a mouse, keyboard, and the like, and allows the user of this apparatus to input various instructions to the CPU 101.

An output device 105 is a device represented by, e.g., a display and printer, and can output an image processed by this apparatus in various formats such as display, printout, and the like.

A network interface 106 serves as an I/F that makes data communications with an external apparatus. Reference numeral 107 denotes a bus that interconnects the aforementioned units. The image processing apparatus according to this embodiment adopts the basic arrangement shown in FIG. 1 for the sake of simplicity in the following description. However, other arrangements may be adopted, and the present invention is not limited to that shown in FIG. 1.

Figure 2:
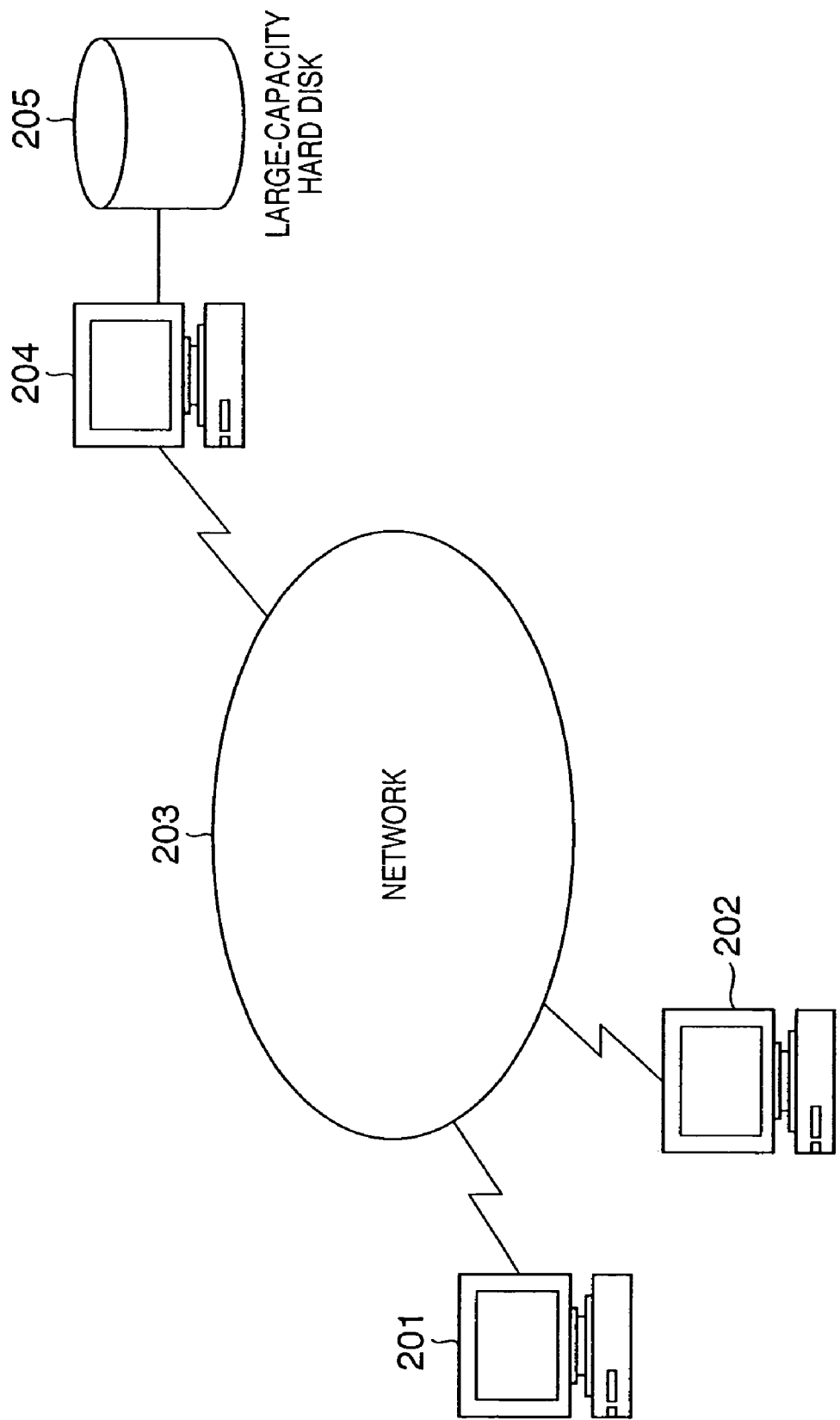
FIG. 2 is a schematic diagram of a system including the image processing apparatus shown in FIG. 1.

FIG. 2 is a schematic diagram of a system including the aforementioned image processing apparatus. Reference numerals 201 and 202 denote client terminals, which can make various data communications via a server 204 as the image processing apparatus and a network 203.

The network 203 includes wired and wireless networks such as the Internet, LAN, and the like.

The server 204 can make data communications with the client terminals 201 and 202 via the network 203, as described above. For example, upon reception of a request of a desired image from the client terminal 201 or 202, the server 204 reads out data corresponding to the request from a storage device 205 (corresponding to the secondary memory 103) that saves encoded image data in large quantities, and returns the data via the network 203. The storage device 205 corresponds to, e.g., a hard disk drive device or a device for reading programs and data from storage media such as a CD-ROM, DVD-ROM, and the like.

In this embodiment, the storage device 205 saves a plurality of image data encoded by an encoding method according to JPEG2000. Therefore, the client terminal 201 or 202 requests the server 204 to send only fragmentary data required to obtain a desired image of desired encoded image data from those saved in the storage device 205.

A process executed when the server 204 transmits encoded image data requested by the client terminal to that client terminal will be described below. In order to download an image saved in the storage device 205, the client terminal must access the server 204 using a Web browser. In response to this access, the server 204 presents some or all images saved in the storage device 205 to the client terminal in the form of thumbnails. In this way, the Web browser displays these images.

When the user of the client terminal designates a desired image from the image group displayed on the Web browser using an input device such as a mouse, keyboard, and the like, the client terminal transmits a transmission request of fragmentary data of the desired image data in accordance with the image size and resolution that meet conditions (screen size, display format, and the like). Since the server 204 transmits fragmentary data according to this request to the client terminal, the client terminal receives this data using a JPIP scheme, and caches it in a buffer.

Upon displaying the received image, the client terminal generates a bitstream complying with the JPEG2000 syntax from the cached data, and decodes and displays that bitstream.

Figure 3:
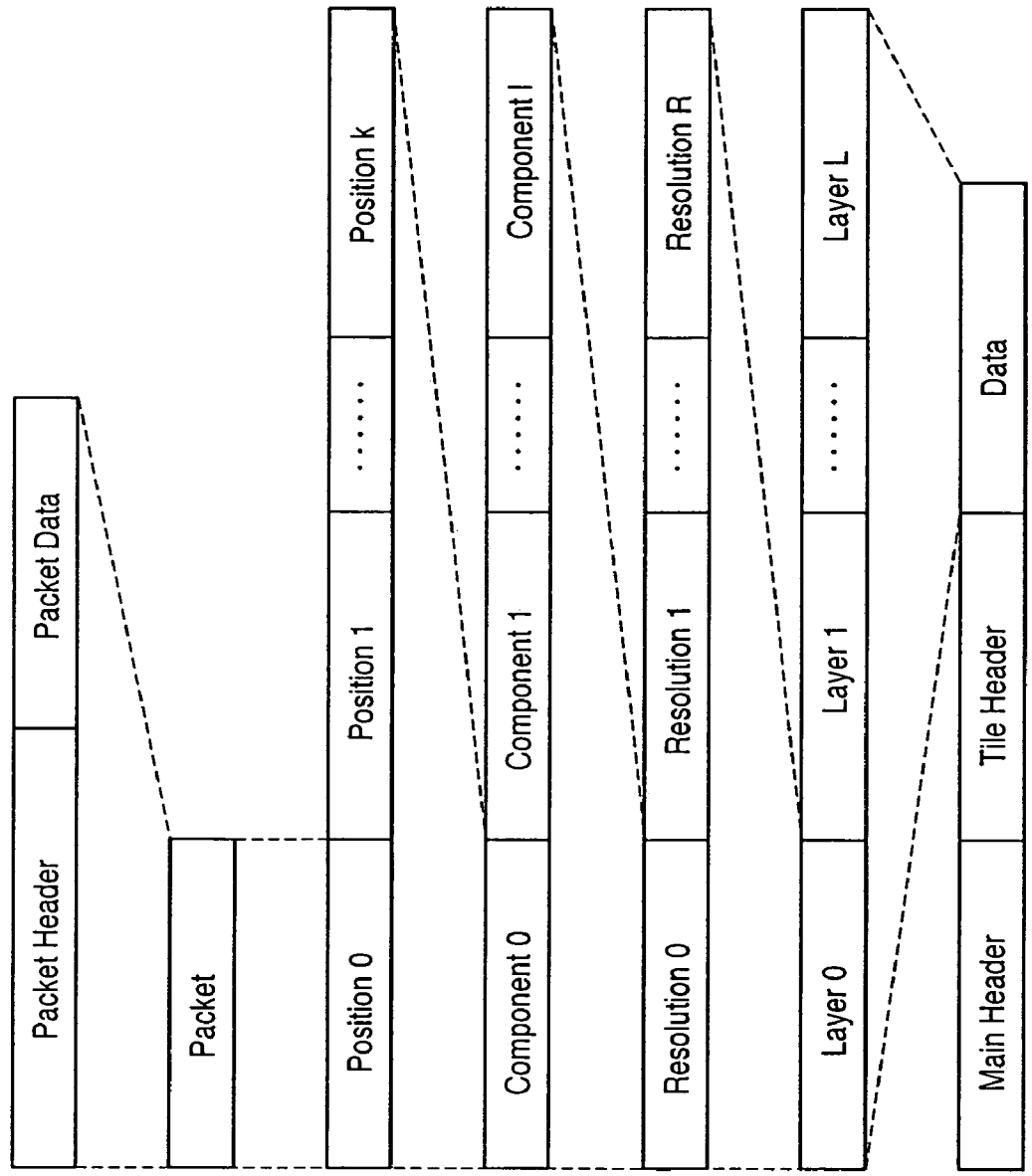
FIG. 3 shows the configuration of a JPEG2000 bitstream according to Layer-resolution level-component-position progression (to be abbreviated as LRCP hereinafter)

A general JPEG2000 bitstream will be explained below. FIG. 3 shows the configuration of a JPEG2000 bitstream according to Layer-resolution level-component-position progression (to be abbreviated as LRCP hereinafter). The JPEG2000 bitstream includes a main header, tile header, and data, and this data field records encoded image data. The tile header is generated for compression-encoded data of each tile when a compression-encoding source image is segmented into rectangles (tiles) each having a predetermined size, and compression-encoded data of respective tiles are generated. Since the main header and tile header are based on the state-of-the-art technique, a description thereof will be omitted.

According to the LRCP, encoded image data (a field indicated by "Data" in FIG. 3) has a configuration in which data are allocated in the order of Layer/Resolution/Component/Position. Such configuration is called a progression order. "Position" means "precinct" in JPEG2000 encoded data.

The JPEG2000 encoded data can be divided into data for respective Layers. Data of respective Layers are bitplane encoded data generated by known bitplane encoding, and are allocated in turn from a bitplane (Layer0) on the MSB side to that (LayerL) on the LSB side. Each Layer number corresponds to an S/N ratio of an image to be reclaimed to an original image, and the S/N ratio impairs (lowers) with decreasing Layer number. That is, in the JPEG2000 data shown in FIG. 3, data of respective Layers are allocated in ascending order of S/N ratio.

Figure 4:
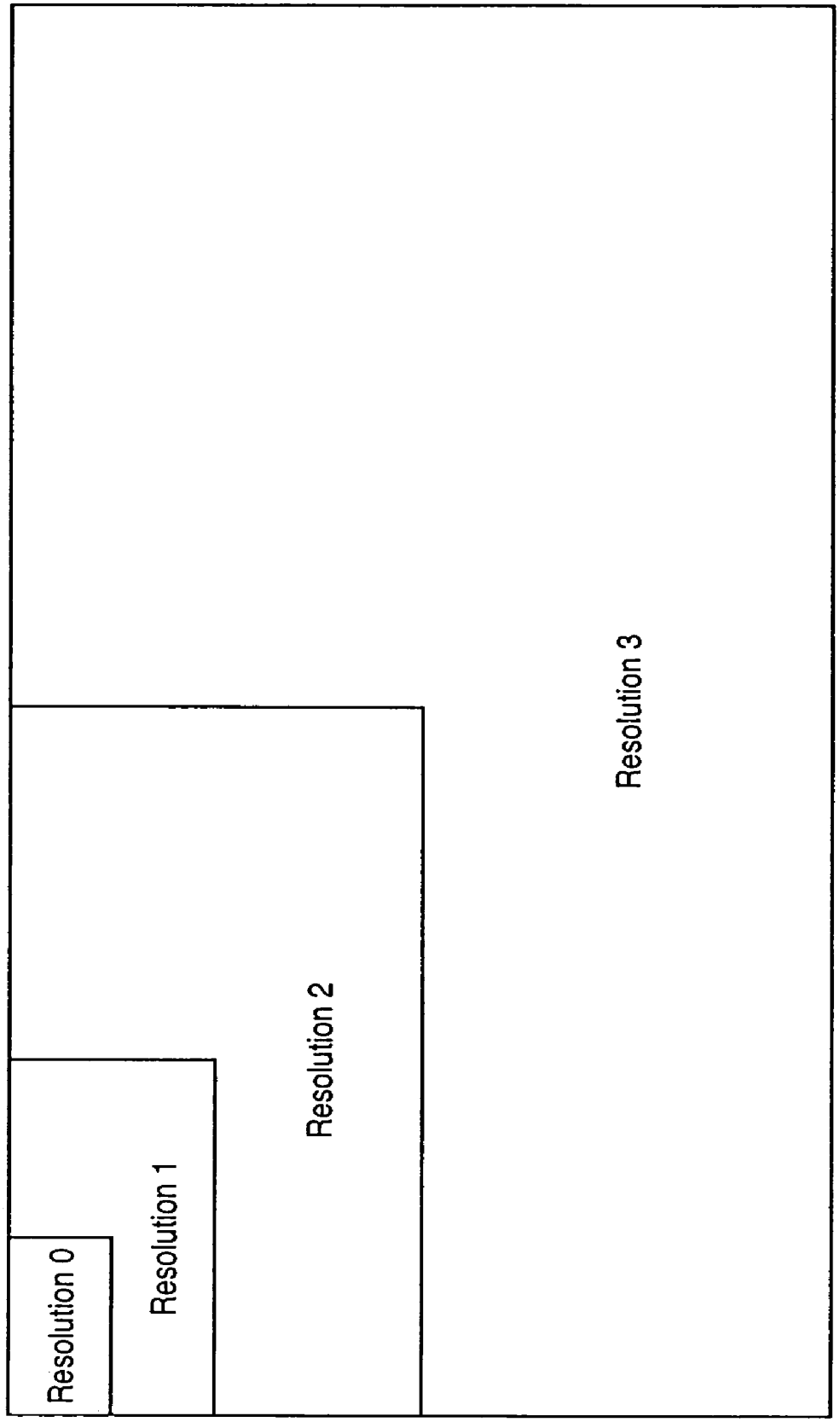
FIG. 4 shows the relationship between the resolutions and Resolution numbers.

Furthermore, data of each Layer is made up of data of respective Resolutions. Data of respective resolutions are allocated in an order based on Resolution numbers according to the resolutions (image sizes). FIG. 4 shows the relationship between the resolutions and Resolution numbers. The Resolution number of an image with the lowest resolution is set to be "0", and the width and height of the image size are doubled as the Resolution number increases by 1. Each Layer stores data in ascending order of Resolution number.

Referring back to FIG. 3, data of each Resolution includes data of respective Components. Data of respective Components correspond to color data of an image. For example, when an image is formed of R, G, and B component data, data of Component0 is data of the R component, data of Component1 is data of the G component, and data of Component2 is data of the B component. That is, the number of Components matches the number of dimensions of the color space of an image.

Each Component data records data of spatial positions (Position data) in the compression encoding source image in turn, and respective Position data are assigned numbers (position numbers) according to their spatial order (for example, the upper left corner of an image has a number "0", and the number is incremented one by one to the right of the image; when the right end is reached, the number is incremented from the left end of the next row to the right of the image).

In one JPEG2000 file, the maximum values of the Resolution number, Layer number, Component number, and position number are set in advance by an encoder, the compression encoding source image is encoded according to these parameters, and that information is recorded in the main header. Each packet includes a packet header field that manages information of code-blocks stored in that packet, and encoded data of the code-blocks. In FIG. 3, one Position data corresponds to a packet. This "packet" is a kind of logical unit.

When a JPEG2000 file with such structure is held by the server, the server can supply only encoded data according to the resolution or the like requested by the client terminal to that client terminal. In case of this embodiment, since data are transmitted/received according to JPIP, tiles or packets of JPEG2000 may be used as units of data to be supplied. This embodiment assumes packets as data units which are to be received by the client terminal from the server.

Figure 5:
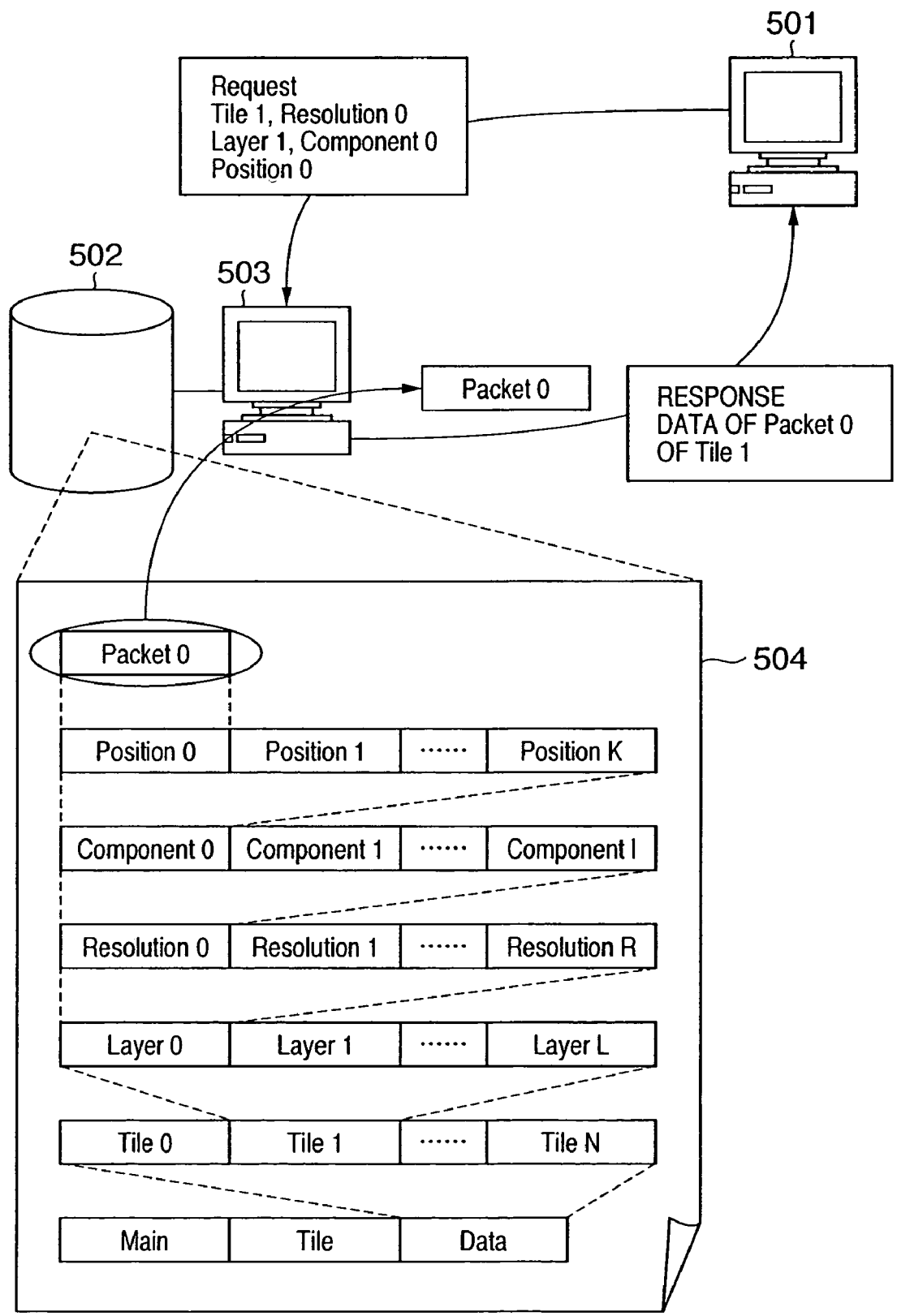
FIG. 5 is a schematic view for explaining a request and response of data for respective packets.

FIG. 5 is a view for explaining the concept of a request and response for each packet.

FIG. 5 shows communications between a server 503 and client terminal 501 when the client terminal 501 requests to send encoded data of a desired tile, resolution, component, and spatial position, in a state wherein an image is segmented into tiles, and encoded data (data of Tile0 to TileN) of respective tiles are stored in a storage device 502 connected to the server 503 as JPEG2000 bitstreams 504.

For example, when the client terminal 501 requests the server 503 to send encoded data with a tile number "1", resolution number "0", layer number "0", component number "0", and position number "0", the server 503 analyzes the JPEG2000 bitstreams 504 saved in the storage device 502, extracts a portion corresponding to the request (i.e., a portion corresponding to the requested tile number, resolution number, layer number, component number, and position number), i.e., packet 0 of tile number 1 as response data, and sends it back to the client terminal 501.

As described above, in this embodiment, JPIP is used upon exchanging image data between the server and client terminal, and encoded image data is transmitted from the server to the client terminal for respective packets.

Figure 6A:
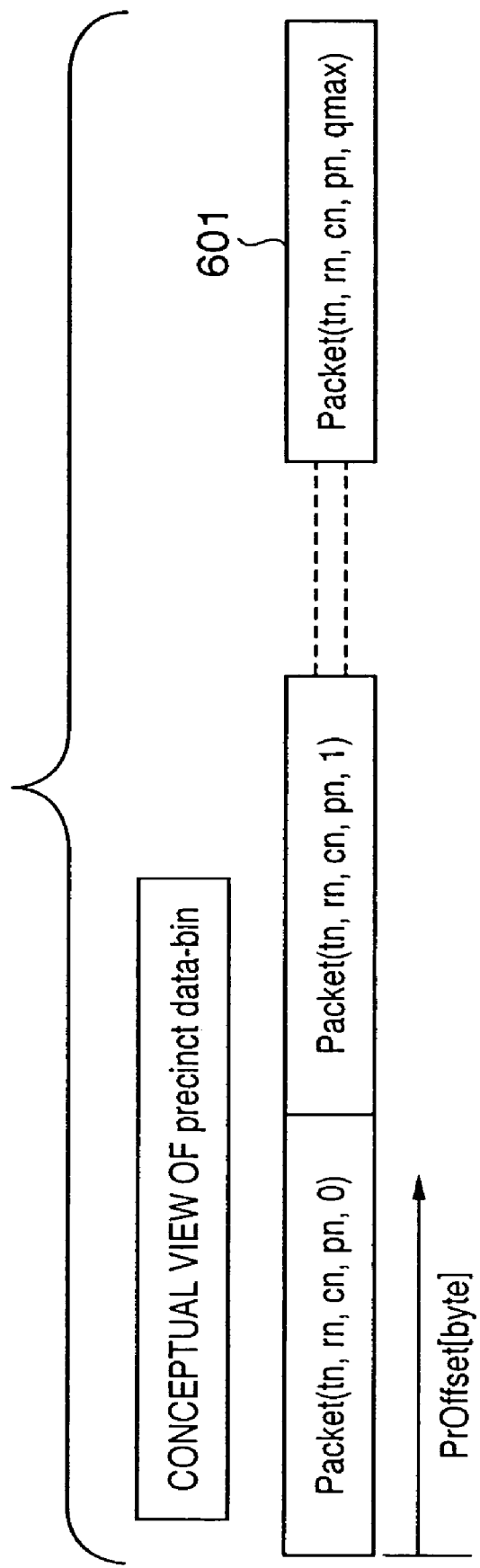
FIG. 6A shows the configuration of a collection of JPEG2000 packet data called a precinct data-bin.

The configuration of response data upon exchanging data using JPIP will be described below. FIG. 6A shows the configuration of a collection of JPEG2000 packet data called a precinct data-bin. In JPIP, response data is generated on the basis of a collection of JPEG2000 packet data called a precinct data-bin, as indicated by 601. The precinct data-bin is a collection of data formed by arranging and joining packets of all layers which form resolution level rn and component number cn of precinct pn in Tile Tn in ascending order of layer number.

JPIP response data is generated using this precinct data-bin. FIG. 6B shows the configuration of the JPIP response data generated using the precinct data-bin shown in FIG. 6A. The JPIP response data includes a message header 608 and message body 609. The message body 609 stores, as response data, data of one or a plurality of packets (Packet(tn, rn, cn, pn, q) shown in FIG. 6A) extracted from the precinct data-bin 601 according to the requested tile and resolution.

The message header 608 includes fields for storing four parameters. A parameter stored in a first field 604 is an identifier which indicates that data stored in the message body 609 is the precinct data-bin. A parameter stored in a second field 605 is a precinct data-bin ID (PrID) corresponding to the precinct data-bin (that shown in FIG. 6A) to which packet data in the message body 609 belongs. This PrID is uniquely determined by tile number tn, resolution level number rn, component number cn, and precinct number pn, and can be calculated by:

$$PrID(tn, rn, cn, pn) = tn + (cn + s \times (\text{number of components})) \times \text{number of tiles}$$

for $$s = pn + tn \times (\text{number of precincts per tile in resolution level } rn) + (\text{sum total of numbers of precincts of tile } tn \text{ from resolution level 0 to } (rn-1))$$

A parameter stored in a third field 606 is an offset value PrOffset (see FIG. 6A) which indicates an offset of the position of each packet data (data for one packet if only one packet is stored) in the message body 609 from the head of the precinct data-bin. A parameter stored in a fourth field 607 is a byte length ResLen [byte] (see FIG. 6B) of the response data, i.e., the message body 609.

The process executed when the image processing apparatus according to this embodiment as the server generates and transmits such JPIP response data (to be also simply referred to as response data hereinafter) to a transmission request source device (to be referred to as a client terminal hereinafter) will be described below. Note that the image processing apparatus according to this embodiment will be referred to as a server in terms of its functions.

Figure 7:
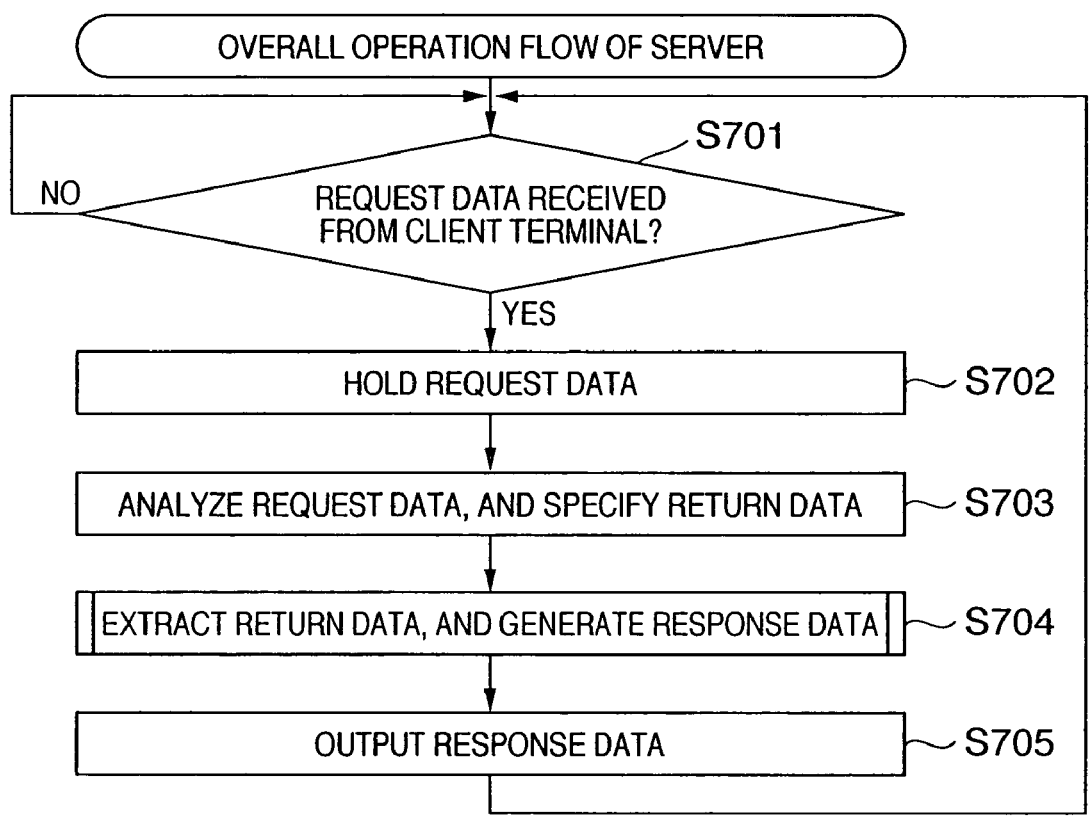
FIG. 7 is a flowchart showing a main process executed when the image processing apparatus according to the first embodiment of the present invention generates and transmits JPIP response data to an apparatus as a transmission request source.

FIG. 7 is a flowchart of a main process executed when the image processing apparatus according to this embodiment generates and transmits JPIP response data to a transmission request source device (client terminal). Note that a program according to the flowchart of FIG. 7 is saved in the secondary memory 103, and is loaded onto the primary memory 102 under the control of the CPU 101. When the CPU 101 executes this program, the image processing apparatus implements the process to be described below.

The server waits for reception of request data (data which indicates a request of an image and region of encoded image data, and also the resolution and the like of an image obtained upon decoding that encoded image data) from the client terminal (step S701). Upon reception of request data, the flow advances to step S702, and the server stores (holds) that request data in the primary memory 102 (step S702). The server analyzes the request data stored in the primary memory 102, and specifies encoded data of an image to be sent back to the client terminal (step S703). That is, the server specifies packet data, which have the resolution level number, layer number, component number, and position number according to the analysis result, and are included in the image according to the analysis result, from data of packets that form encoded image data held in the secondary memory 103.

The server extracts the specified packet data from the encoded image data held in the secondary memory 103, and converts the packet data into data according to the JPIP response syntax, thus generating response data (step S704).

In this embodiment, the server rearranges packet data according to the progression order used on the client terminal side, so that the client terminal can easily decode packet data included in the response data upon sending back the generated response data to the client terminal. In this way, the client terminal can generate a requested image by decoding packet data included in the response data in the received order without rearranging them according to the progression order used. Hence, the time required for decoding can be shortened, and the time required until an image is displayed can also be shortened.

Note that details of the process for rearranging packets included in response data in advance in accordance with the progression order used on the client terminal side (step S704) will be described later. Referring back to FIG. 7, after the response data is generated, the server transmits this response data to the client terminal (step S705).

Figure 8:
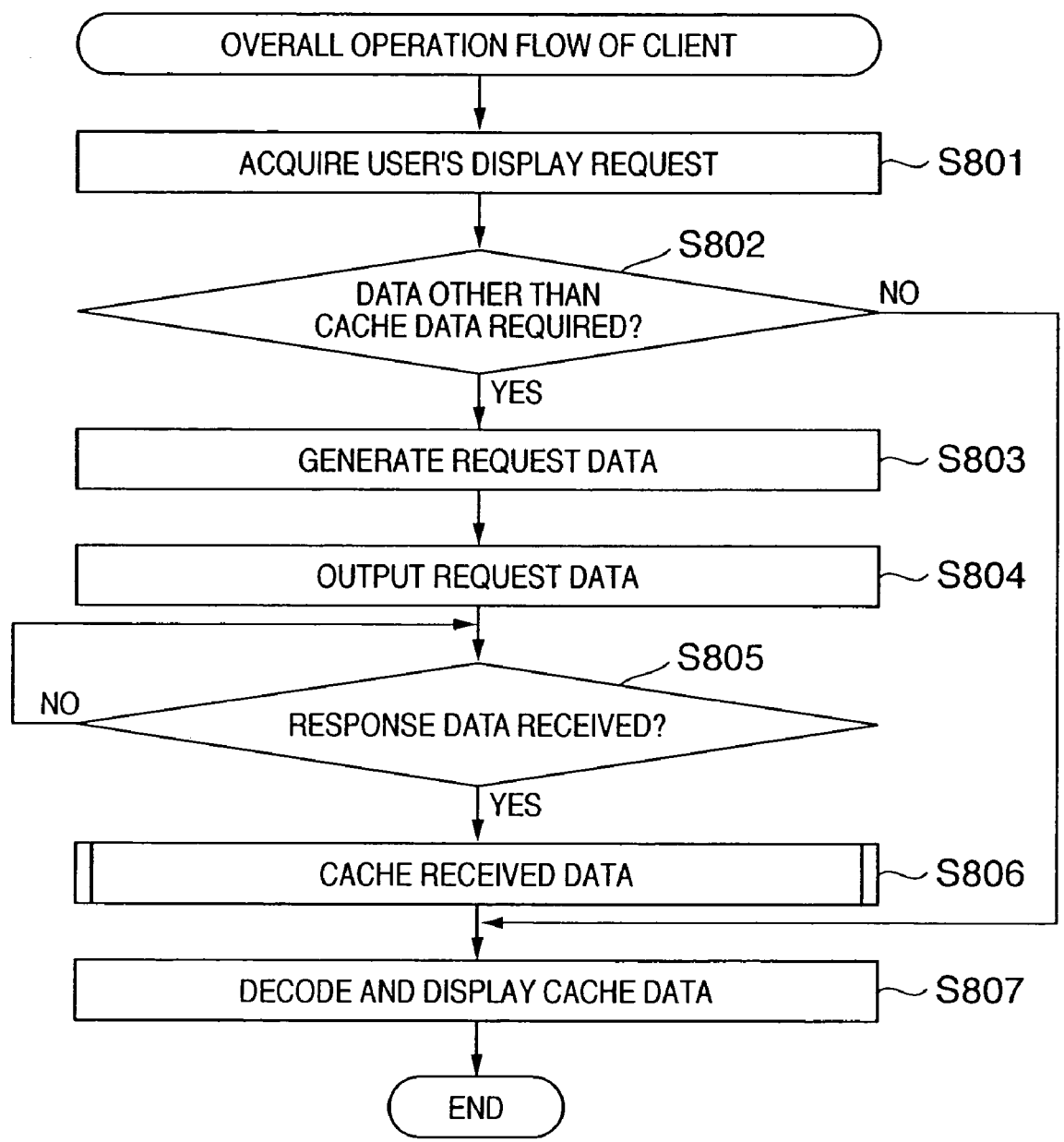
FIG. 8 is a flowchart showing a process to be executed by a client terminal which requests a server to send encoded image data required to obtain a desired image.

The process to be executed by the client terminal which requests the server to send encoded image data required to obtain a desired image will be described below with reference to FIG. 8 that shows the flowchart of this process. Note that a program according to the flowchart of FIG. 8 is stored in a memory (not shown) in the client terminal, and when a CPU (not shown) of the client terminal executes this program, the client terminal can implement the process according to the flowchart shown in FIG. 8.

An image display request from the user is acquired (step S801). That is, information indicating a portion to be finally displayed of the entire image, the size upon displaying an image, and the like is acquired. Note that the request of encoded image data is not limited to the "display" request, and even when data is requested for other purposes such as print and the like, the process shown in FIG. 8 can be applied.

It is determined with reference to the contents of the display request if an image indicated by this display request is obtained by only encoded image data (cache data) which is held in advance by the client terminal (step S802). For example, since this embodiment adopts encoded data according to JPEG2000 as encoded image data, encoded data of more subbands are required to obtain an image with a higher resolution. Therefore, if the display request requests an image which can be expressed by subbands fewer than the number of subbands held in advance, the request can be complied with by only the held encoded data.

Therefore, if the display request can be complied with by only cache data, the flow advances to step S807 to decode only a portion required to comply with the display request, and to display an image as the decoding result on a display device (not shown) (step S807).

On the other hand, if the display request cannot be complied with by only the cache data, i.e., if a request of deficient encoded image data is to be sent to the server, the flow advances to step S803 to generate request data as data that requests the server to send encoded image data corresponding to that deficiency (step S803). This "encoded image data corresponding to the deficiency" can be uniquely determined from the display request contents acquired in step S801 and cache data. Then, this request data is transmitted to the server (step S804).

Upon detection of encoded image data transmitted from the server as response data to this request data (step S805), the flow advances to step S806 to cache the received response data (step S806). Details of the cache process will be described later. The cache data that has been cached previously and the currently received cache data are decoded together, and an image as a decode result is displayed on a display device (not shown) (step S807).

Figure 9:
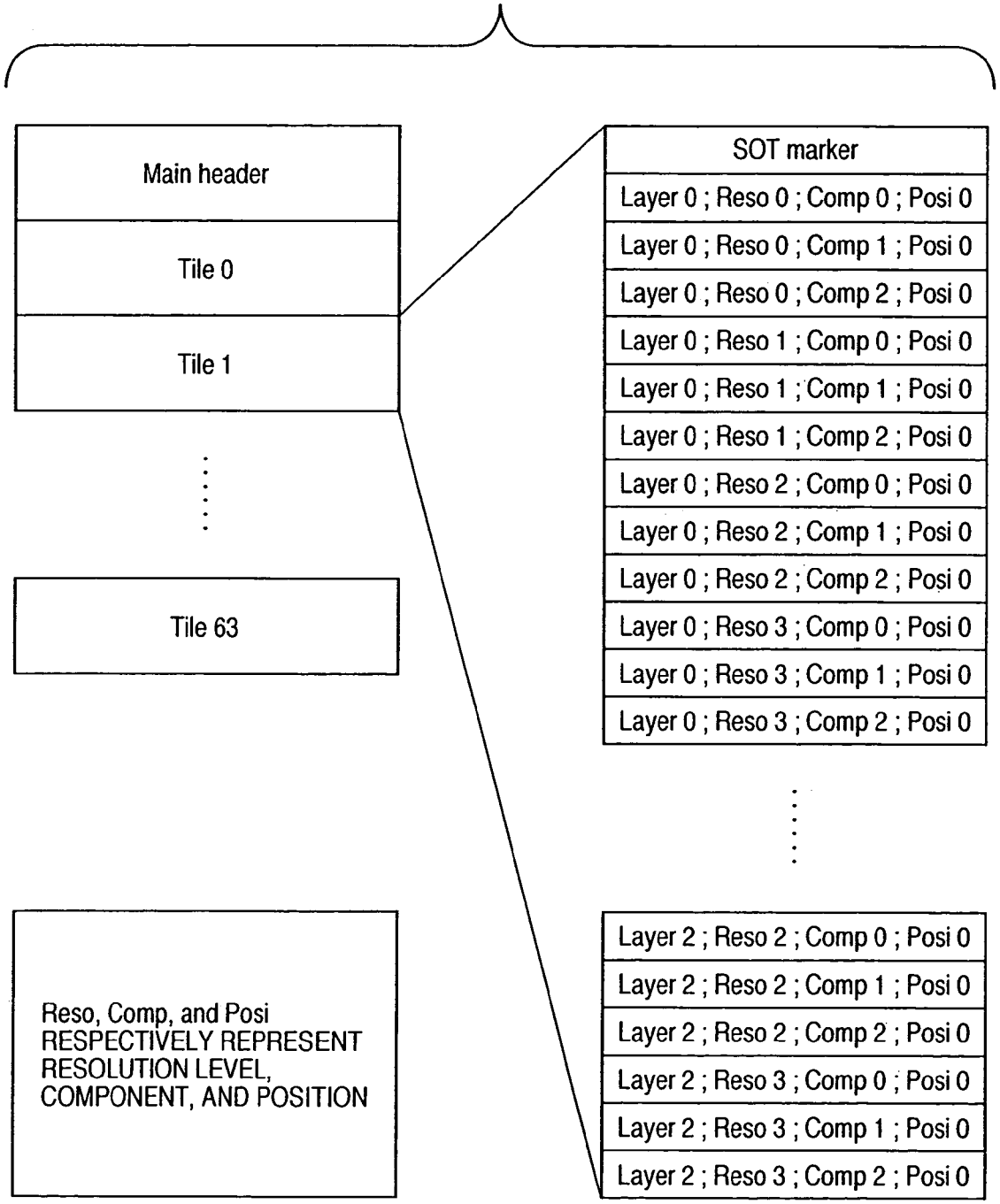
FIG. 9 shows a schematic configuration of encoded data of encode conditions according to the first embodiment of the present invention.
Figure 10:
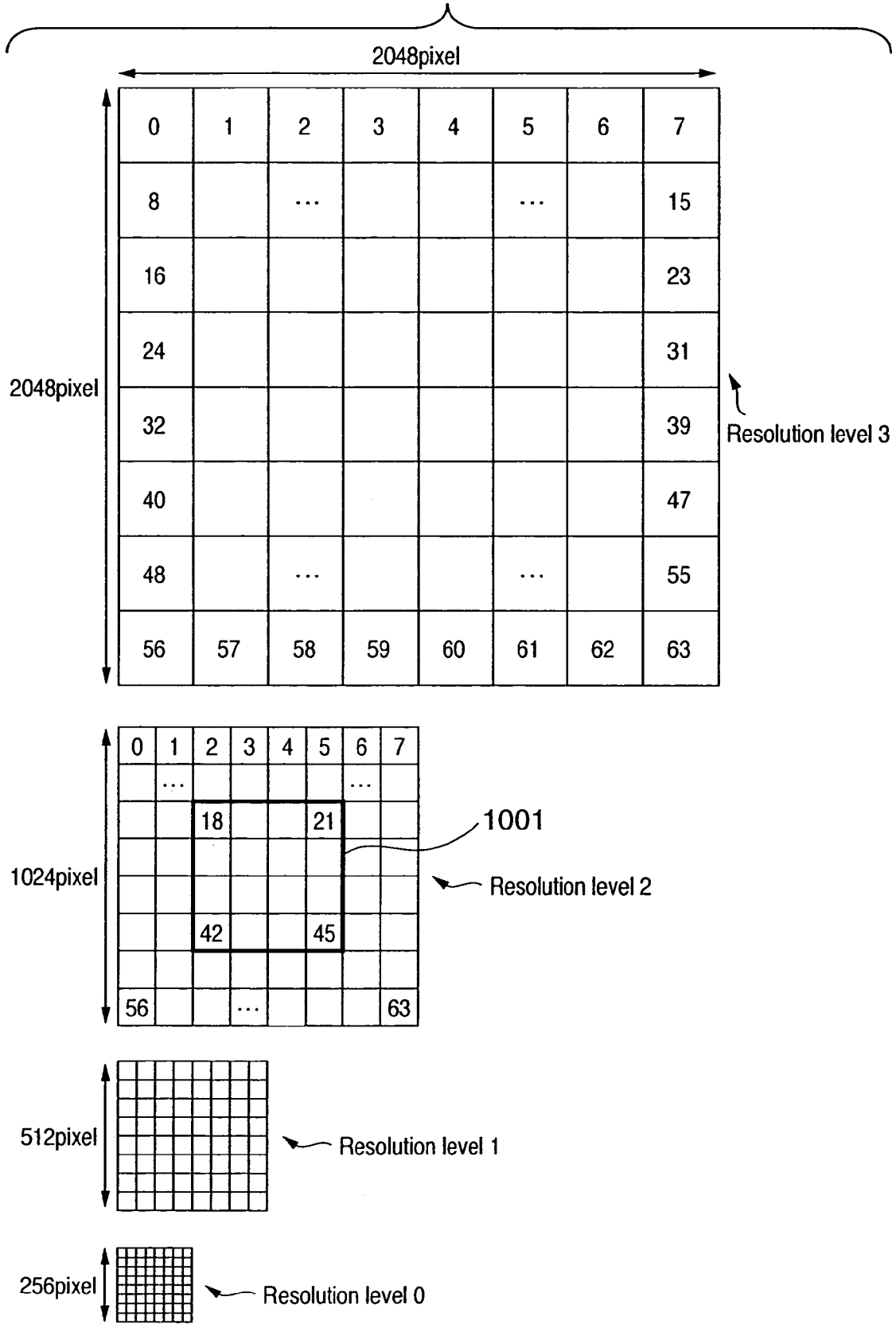
FIG. 10 shows the resolutions of images at respective resolution levels, and tile numbers in respective images.

In this embodiment, the encode conditions of encoded image data held in the secondary memory 103 on the server side include:

Image size at maximum resolution: 2048×2048 [pixels]
Tile segmentation: segment into 8×8=64 tiles
Number of Resolution levels: 4 (i.e., resolution levels 0 to 3)
Number of Layers: 3 (i.e., Layers 0 to 2)
Number of Positions: 1 position/1 tile
Number of Components: 3 (i.e., components 0 to 2)
Progression order: Layer-Resolution-Component-Position FIG. 9 shows the schematic configuration of encoded data of such encode conditions according to this embodiment. FIG. 10 shows the resolutions of images at respective resolution levels and tile numbers in respective images. As shown in FIG. 9, encoded data includes a main header, and encoded data of respective tiles which follow the main header. As shown in FIG. 10, tile numbers are sequentially assigned to respective tiles in turn from the upper left corner of an image. Therefore, the encoded data of respective tiles shown in FIG. 9 are arranged in the order of tile numbers.

Assume that an image display application used on the client terminal side mainly uses scalability in the resolution direction, this application currently displays the entire image using data of resolution level 1 and layer 2 (this image is an image as a decoding result of encoded data initially transmitted from the server), and it requests the server to send data required to display the central portion of an image indicated by a region 1001 shown in FIG. 10 by resolution level 2 and layer 2. Data of packets to be returned from the server to the client terminal belong to:

Tile number: 18 to 21, 26 to 29, 34 to 37, and 42 to 45, and have:

Resolution level number: 2
Layer number: 0 to 2
Position number: 0
Component number: 0 to 2

Furthermore, assume that data other than the main header and packet data are not written in a cache file on the client terminal side, which saves received data for the sake of simplicity.

Figure 11:
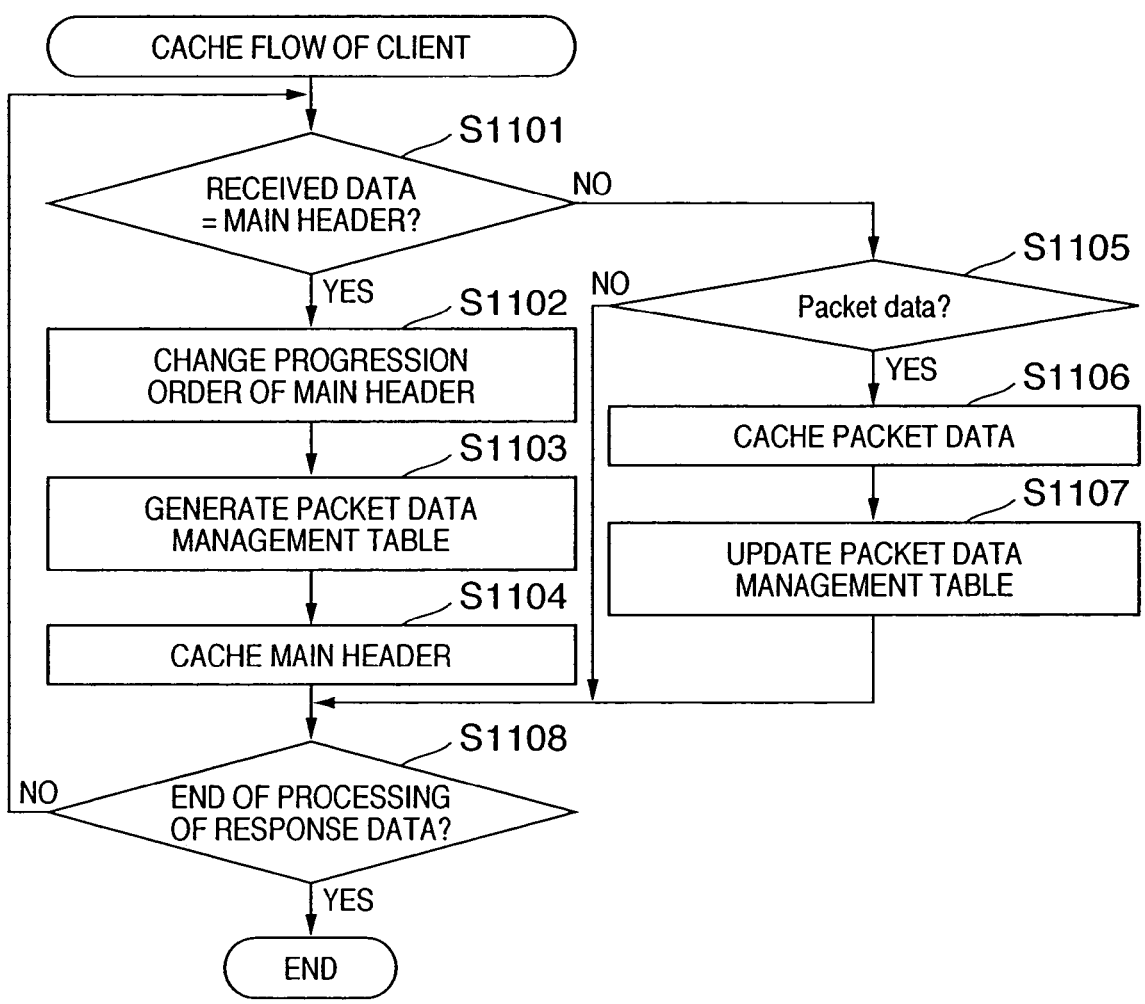
FIG. 11 is a flowchart of a process in step S806, i.e., a process executed when a client terminal caches data of the received main header and respective packets as cache data.

Based on the aforementioned setups, the process in step S806, i.e., the process executed when the client terminal caches data of the received main header and respective packets as cache data, will be described below with reference to FIG. 11 as the flowchart of this process.

The received response data is analyzed, and it is checked if data to be processed is a main header (step S1101). If the data to be processed is the main header, the flow advances to step S1102 to acquire the "progression order of encoded data included in this response data" as information included in this main header, and to update this information to the progression order (that which is used by the image display application) used on the client terminal side (step S1102).

Figure 12:
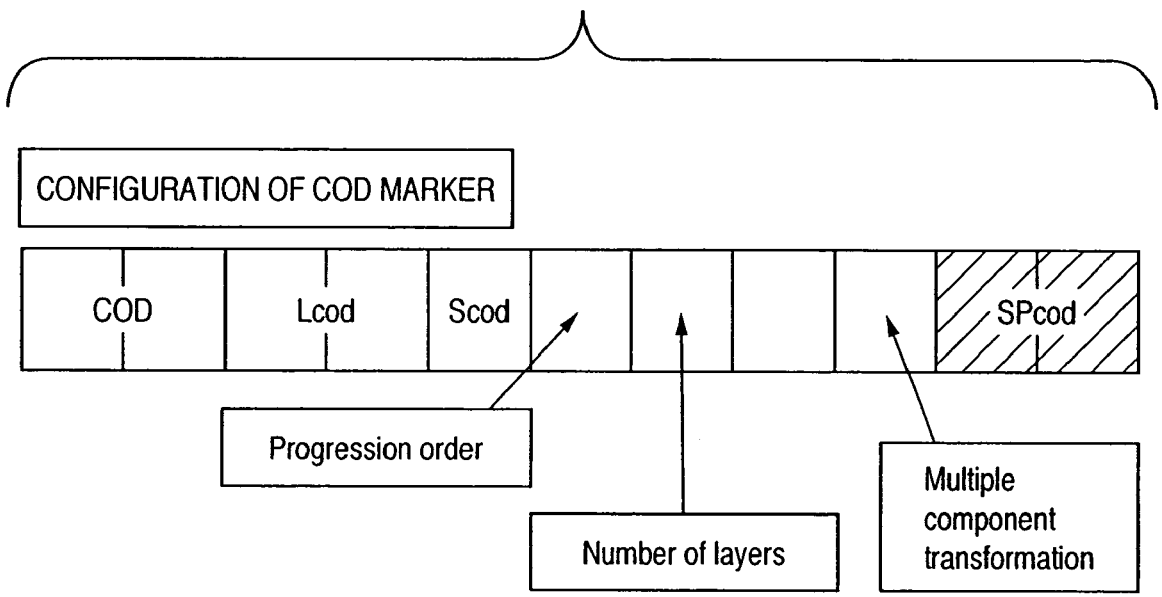
FIG. 12 shows the configuration of a COD marker.

More specifically, the progression order is determined by reading the value of a 6th-byte field 1201 of a COD marker (see FIG. 12) included in the main header. The correspondence between the values of the field 1201 and progression orders is as follows:

Layer-Resolution-Component-Position (to be abbreviated as LRCP hereinafter) when the value is 0×00;
Resolution-Layer-Component-Position (to be abbreviated as RLCP hereinafter) when the value is 0×01;
Resolution-Position-Component-Layer (to be abbreviated as RPCL hereinafter) when the value is 0×02;
Position-Component-Resolution-Layer (to be abbreviated as PCRL hereinafter) when the value is 0×03; and
Component-Position-Resolution-Layer (to be abbreviated as CPRL hereinafter) when the value is 0×04.FIG. 12 shows the configuration of the COD marker. Assuming that the main header transmitted from the server includes the COD marker shown in FIG. 12, the value of the field 1201 is 0×00, i.e., the progression order of packet data received after this main header is LRCP. On the other hand, the progression order (that which is used by the image display application) used on the client terminal side is RLCP, as described above. Hence, the value of this field 1201 is rewritten to 0×01 corresponding to RLCP.

Next, a packet data management table that stores information used to manage packet data in the progression order updated in step S1102 is prepared (step S1103). Information to be written in this packet data management table includes flag information indicating whether or not each packet data has already been cached, position information of each packet in encoded data including all data of the packets and main header, the data length of each packet, and the like.

Data of the received main header is written in the cache (step S1104). If the process for receiving response data, i.e., reception of all data (data of the main header and respective packets) that form the response data is complete, the process shown in FIG. 11 ends. On the other hand, if reception of all data is not complete, the flow returns to step S1101 to repeat the subsequent steps.

If it is determined in step S1101 that data to be processed is not a main header, the flow advances to step S1105 to check if data to be processed is packet data (step S1105). If the data to be processed is packet data, the flow advances to step S1106 to write this packet data in the cache. Information used to manage this cached packet is registered in the packet management table (step S1107), and the flow advances to step S1108.

Figure 13:
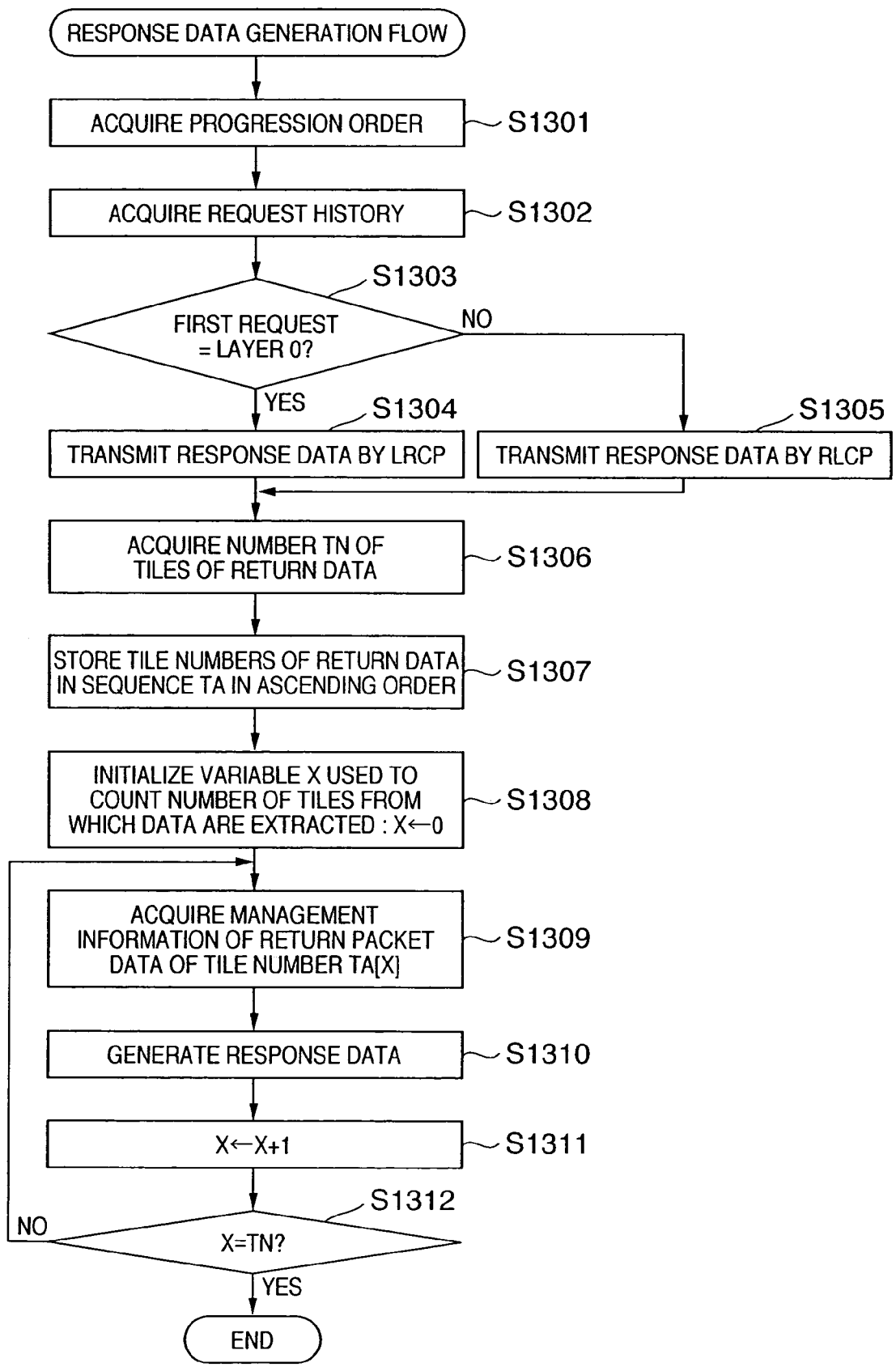
FIG. 13 is a flowchart showing details of a process in the process (step S704) for generating response data by rearranging packets in advance in accordance with a progression order used on the client terminal side.

Details of a process in the process (step S704) for generating response data by rearranging packets in advance in accordance with the progression order used on the client terminal side will be described below using FIG. 13 as the flowchart showing details of this process.

As described above, the server stores encoded data of a plurality of images in the secondary memory 103. Upon reception of request data from the client terminal, the server interprets the request data, and specifies an image, encoded data of which is to be requested. Next, the server analyzes the main header of the encoded data of the specified image to acquire a progression order (step S1301). As the acquisition method, the server determines the progression order by reading the value of the 6th-byte field of a COD marker included in the main header in the same manner as in the process in step S1102.

Note that the server manages the contents (about data, client terminal, time of exchange, and the like) of data exchange with the client terminals in previous data communications in the secondary memory 103 as history information. In this embodiment, since the client terminal has requested this server to send data required to display an image of resolution level 1 by layer 2 as the highest image quality first, the previous data communication contents with this client terminal are managed in the secondary memory 103.

Hence, the server loads this history onto the primary memory 102 to acquire it (step S1302). Since a technique that refers to the previous communication history with a device as a partner of the current communication is known to those who are skilled in the art, a description thereof will be omitted.

The first request to the currently requested image is specified by analyzing this history information, and it is checked if data of layer 0 was requested first (step S1303). If data of layer 0 was requested first, the flow advances to step S1304. In step S1304, the server discriminates that this client terminal exploits scalability in the image quality direction, and determines LRCP as the progression order used on this client terminal side (step S1304).

On the other hand, if data of layer 0 was not requested first, the flow advances to step S1305. In step S1305, the server discriminates that this client terminal does not frequently use scalability in the image quality direction, and determines RLCP as the progression order used on this client terminal side (step S1305).

In this embodiment, since data that the client terminal requested the server first was data required to display an image of resolution level 1 by layer 2 as the highest image quality, the server discriminates that this client terminal does not frequently use scalability in the image quality direction, and determines RLCP as the progression order used on this client terminal side. Therefore, in such case, the server determines to transmit packet data in the order of RLCP.

The server acquires the number TN of tiles of an image to be sent back according to this request with reference to the request data stored in step S702 (step S1306). In this embodiment, since 16 tiles included in the region 1001 shown in FIG. 10 are to be sent back, TN=16. The server stores tile numbers of these 16 tiles in a sequence TA in ascending order. In this embodiment, tile numbers are stored as follows.

$TA[0]=18, TA[1]=19, TA[2]=20, TA[3]=21$ $TA[4]=26, TA[5]=27, TA[6]=28, TA[7]=29$ $TA[8]=34, TA[9]=35, TA[10]=36, TA[11]=37$ $TA[12]=42, TA[13]=43, TA[14]=44, TA[15]=45$

Subsequently, since a process for extracting data of tiles to be sent back from the requested encoded image data, and storing them in response data is to be executed, a variable for counting tiles to be extracted is required. Hence, let X be this variable, and this variable is initialized to zero (step S1308). Processes from step S1309 to step S1311 are repeated until X=TN, i.e., for all tiles to be sent back.

Management data of data of packets which form a tile with a tile number TA[X] is acquired (step S1309). Details of the process in step S1309 and this management information will be described later. Briefly speaking, this information is used to specify packets which form one tile. Therefore, using this management information, data of only required packets can be extracted from encoded image data.

Hence, data of required packets are extracted to meet conditions (requested image size, resolution, and the like) requested by the request data, and are joined to generate response data (step S1310). Details of the process in step S1310 will be described later. The variable X is incremented by 1 (step S1311). If X<TN (step S1312), the processes in step S1309 and subsequent steps are repeated.

Details of the process in step S1309, i.e., the process for acquiring management information of data of packets that form a tile with a tile number TA[X] will be described below with reference to FIG. 14 as the flowchart that shows details of this process. In this embodiment, since the progression order used on the client terminal side, i.e., the transmission order of data is RLCP, the flowchart shown in FIG. 14 has contents according to that order.

Minimum and maximum values of numbers of "position, component, layer, resolution level" of encoded data to be requested to the server, which are obtained by the analysis process in step S703 and are indicated by the request data, are respectively substituted in Pmin, Pmax, Cmin, Cmax, Lmin, Lmax, Rmin, and Rmax (step S1401). In this embodiment, the values of respective values are (Pmin, Pmax)=(0, 0), (Cmin, Cmax)=(0, 2), (Lmin, Lmax)=(0, 2), and (Rmin, Rmax)=(2, 2).

Next, a table B_mng used to save management information of data of respective packets to be transmitted to the client terminal is assured on the primary memory 102, and is initialized (step S1402). The management information to be saved in the table B_mng includes the following four pieces of information:

JPIP precinct data-bin ID (B_mng[bx].id)
offset in JPIP precinct data-bin (B_mng[bx].offset)
packet sequence number (B_mng[bx].number)
sequence numbers of packets of layer 0 that belong to identical precinct data-bin ID (B_mng[bx].same)

Since these four pieces of information are registered in the table B_mng as management information for one packet, tables B_mng are set on the primary memory 102 in correspondence with the number of packets to be sent back. Since the tables B_mng are in correspondence with packets to be sent back, a variable bx used to count the tables B_mng is initialized to zero in step S1402.

If each of these four pieces of information is stored as 4-byte data, the size of the tables B_mng can be calculated by:

$4 \times 4 \times$(number of packets to be sent back per tile)=$4 \times 4 \times (Pmax-Pmin+1) \times (Cmax-Cmin+1) \times (Lmax-Lmin+1) \times (Rmax-Rmin+1)$ [bytes].

Therefore, in case of this embodiment, the size of the tables B_mng is $4 \times 4 \times (0-0+1) \times (2-0+1) \times (2-0+1) \times (2-2+1)=144$ [bytes].

As for initialization of the table B_mng in step S1402, all four pieces of information may be initialized to zero, but only B_mng[bx].offset need only be initialized by substituting 0 in it.

The value of Rmin is substituted in a resolution level count variable r to initialize that variable (step S1403), the value of Lmin is substituted in a layer count variable q to initialize that variable (step S1404), Cmin is substituted in a component count variable c to initialize that variable (step S1405), and Pmin is substituted in a position count variable p to initialize that variable (step S1406). Therefore, in this embodiment, the respective variables r, q, c, and p are respectively initialized to r=2, q=0, c=0, and p=0. The order of the processes in steps S1403 to S1406 depends on the transmission data order, and follows RLCP in this embodiment.

Next, a precinct data-bin ID as an ID corresponding to a precinct data-bin specified by the initialized r, c, and p (to be expressed as PrID(TA[X], r, c, p) hereinafter) is obtained, and is saved in B_mng[bx].id (step S1407). This ID can be calculated by:

*PrID(TA[X], r, c, p)=TA[X]+(c+s×*(number of components))×number of tiles for

*s=p+TA[X]×*(number of precincts per tile in resolution level *r*)+(sum total of numbers of precincts of tile *TA[X] from resolution level* 0 to (*r*−1))

In this embodiment, the ID can be actually calculated by:

$$PrID(TA[X], r, c, p) = TA[X] + (c + (p + TA[X] + r \times 1) \times 3) \times 64$$

For example, as for TA[0]=18, B_mng[0].id saves a value, i.e., PrID(18, 2, 0, 0)=18+(0+(0+18+2×1)×3×64=3858.

A packet sequence number (to be expressed as Packet(TA [X], r, c, p, q) hereinafter) as a number indicating the order of each packet in a tile is calculated on the basis of the progression order acquired in step S1301, and is saved in B_mng[bx] .number (step S1408). In this embodiment, since the progression order is LRCP, the packet sequence number can be calculated by:

$$Packet(TA[X], r, c, p, q) = p + c \times Pnum + r \times Cnum \times Pnum + q \times Rnum \times Cnum \times Pnum =$$

$$p + c + r \times 3 + q \times 4 \times 3$$

where Pnum=the number of positions per tile

Cnum=the number of components

Rnum=the number of resolution_level

For example, as for TA[0]=18, B_mng[0].number stores a value, i.e., Packet(18, 2, 0, 0, 0)=0+0+2×3+0×4×3=6. The smallest packet sequence number of packets having the same precinct data-bin ID is calculated, and is saved in B_mng[bx] .same (step S1409). The process in step S1409 will be explained below taking the precinct data-bin 601 shown in FIG. 6A as an example. As described above, the precinct data-bin ID is assigned to data formed by joining a plurality of packets in the layer direction, and data of packets included in this precinct data-bin 601 have the same tile number, resolution level number, component number, and precinct number. Therefore, the packet sequence number of the first one of these packets is saved in B_mng[bx].same.

Therefore, in this embodiment, B_mng[bx].same can be calculated by:

$$B\_mng[bx].same = Packet(TA[X], r, c, p, 0) = p + c \times Pnum + r \times Cnum \times Pnum = p + c + r \times 3$$

For example, as for TA[0]=18, since B_mng[0] .same=Packet(18, 2, 0, 0, 0), B_mng[0].same saves the same value as B_mng[0].number, i.e., 6.

The variable bx is incremented by one to acquire management information of the next packet (step S1410). The position count variable p is incremented by 1 (step S1411), and the value indicated by the incremented variable p is compared with the maximum value Pmax of the position number (step S1412). If p≦Pmax, the flow returns to step S1407 to repeat the subsequent steps. On the other hand, if p>Pmax, the flow advances to step S1413.

In this embodiment, since Pmax=Pmin=0, p=1>Pmax=0 after a series of processes in steps S1407 to S1410 are executed once. Therefore, the flow advances to step S1413 without returning to step S1407.

In step S1413, the component count variable c is incremented by 1 (step S1413). The value indicated by the incremented variable c is compared with the maximum value Cmax of the component number (step S1414). If c≦Cmax, the flow returns to step S1406 to repeat the subsequent steps. On the other hand, if c>Cmax, the flow advances to step S1415.

In this embodiment, since Cmax=2, c=3>Cmax=2 after a series of processes in steps S1407 to S1410 are repeated three times, and the flow advances to step S1415.

In step S1415, the layer count variable q is incremented by 1 (step S1415). The value indicated by the incremented variable q is compared with the maximum value Lmax of the layer number (step S1416). If q≦Lmax, the flow returns to step S1405 to repeat the subsequent steps. On the other hand, if q>Lmax, the flow advances to step S1417.

In this embodiment, since Lmax=2, q=3>Lmax=2 after a series of processes in steps S1407 to S1410 are repeated three times, and the flow advances to step S1417.

In step S1417, the resolution level count variable r is incremented by 1 (step S1417). The value indicated by the incremented variable r is compared with the maximum value Rmax of the resolution level number (step S1418). If r≦Rmax, the flow returns to step S1404 to repeat the subsequent steps. On the other hand, if r>Rmax, this process ends.

In this embodiment, since Rmin=Rmax=2, r=3>Rmax=2 after a series of processes in steps S1407 to S1410 are executed once, and this process ends.

Figure 14:
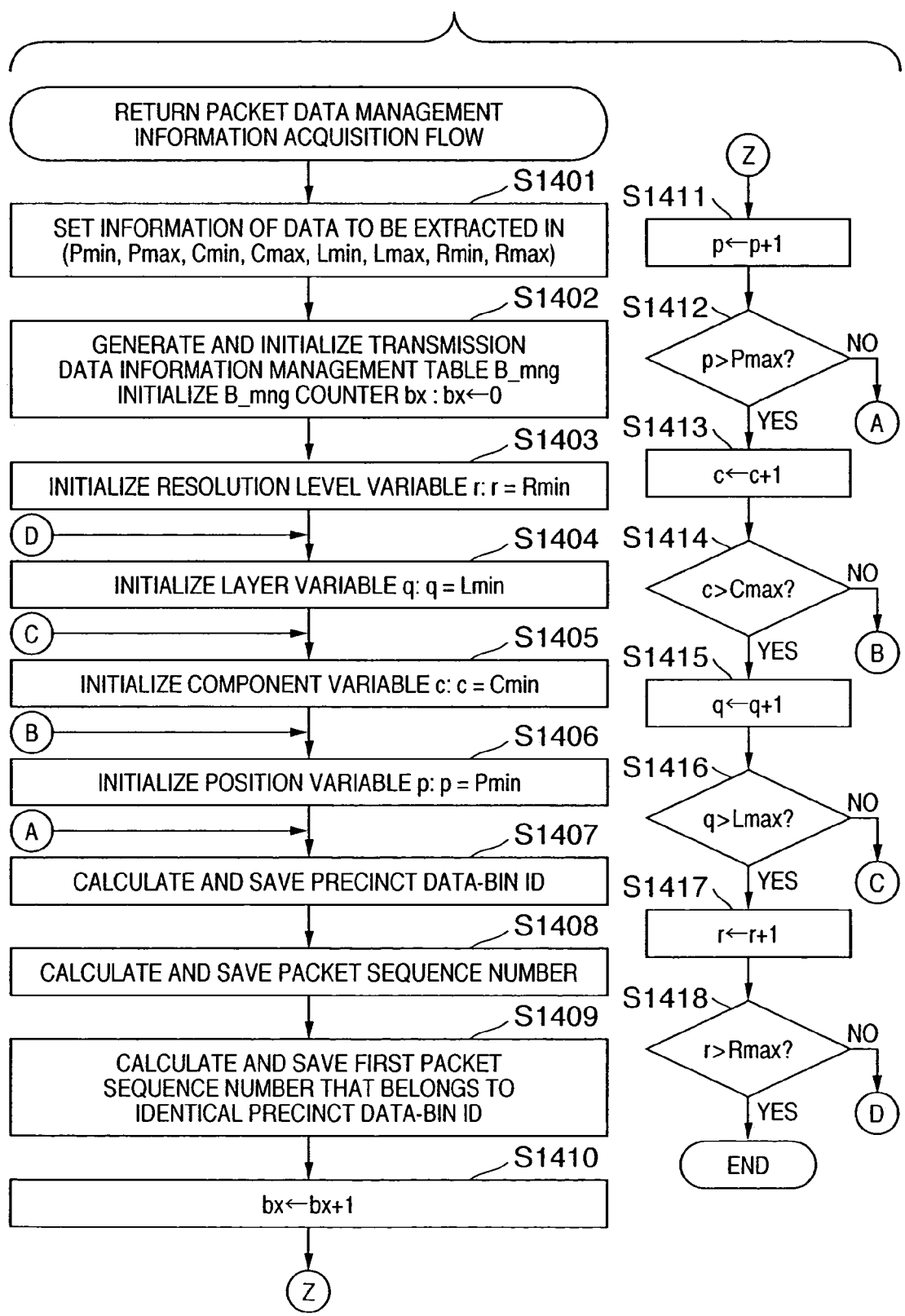
FIG. 14 is a flowchart showing details of the process in step S1309, i.e., a process for acquiring management information of data of packets that form a tile with a tile number TA[X]

Upon completion of the process explained using FIG. 14, the tables B_mng can store management information of packets to be transmitted to the client terminal in the tile with the tile number TA[X] in their transmission order.

Details of the process in step S1310, i.e., the process for generating response data to be transmitted to the client terminal will be described below using FIG. 15 as the flowchart that shows details of the process.

In order to select the first packet, i.e., a packet with a sequence number "0" of those which form a tile with a tile number TA[X] as a packet to be processed, the storage location (address) of this packet (including data of the packet, and data of a header for this packet) is substituted in a pointer (step S1501).

The total number TaPn of transmission packets in the tile with the tile number TA[X] is calculated (step S1502). This total number can be calculated by TaPn=(Pmax−Pmin+1)× (Cmax−Cmin+1)×(Rmax−Rmin+1)×(Lmax−Lmin+1) using Pmin, Pmax, Cmin, Cmax, Rmin, Rmax, Lmin and Lmax acquired in step S1401.

Next, the tables B_mng that store management information of respective transmission packets, which have been explained using FIG. 14, are acquired (step S1503). The tables B_mng may be saved in the secondary memory 103 after they are obtained, and may be loaded onto the primary memory 102 in this step. Alternatively, the tables may be kept stored in the primary memory 102, and may be processed in this step.

A variable bx used to count the tables B_mng for respective packets is initialized to zero, and a variable px used to count a packet sequence number is initialized to zero (step S1504). Note that the tables B_mng are prepared for respective packets, and are arranged in the transmission order of packets. Therefore, the variable bx serves as a counter for the tables B_mng, and also as a variable corresponding to the number of the transmission order of packets.

A packet length plen of the packet indicated by the current pointer (in other words a packet with the packet sequence number=px) is acquired with reference to its header data (step S1505). Since the number of the packet to be processed is px, transmission packets must be searched for a packet having a packet sequence number of the same value as that indicated by px. Therefore, it is checked if the value of B_mng[bx] .number is equal to the value (packet sequence number) indicated by the variable px (step S1506).

If the two values are equal to each other, since the packet indicated by the current pointer is a transmission packet, data of the packet indicated by the current pointer is read out from the encoded data stored in the secondary memory 103 onto the primary memory (step S1507), and a message header (corresponding to 608 in FIG. 6B) for the transmission data is generated based on B_mng[bx].id and B_mng[bx].offset (step S1508). The data of the message header generated in step S1508 is appended to the head of the data of the packet read out in step S1507, thus generating response data (step S1509). Then, the variable bx is incremented by one (step S1510).

Next, it is checked if the value indicated by the variable bx is equal to "the number of transmission packets in the tile with the tile number TA[X]" indicated by the variable TaPn (step S1511). If the two values are equal to each other, it is determined that the response data which includes all transmission packets in the tile with the tile number TA[X] is generated, thus ending this process.

On the other hand, if the value indicated by the variable bx is different from that indicated by the variable TaPn, transmission packets to be included in the response data still remain, and the flow advances to step S1515 to substitute the storage location (address) of the next packet (including data of the packet, and data of a header for this packet) in the pointer (step S1515). The variable px is incremented by one, and the flow returns to step S1505 to repeat the subsequent steps.

On the other hand, if it is determined in step S1506 that the value of B_mng[bx].number is not equal to the value (packet sequence number) indicated by the variable px, the flow advances to step S1512. For example, even when the process for substituting the storage location (address) of the next packet is done in step S1515 after the process for including a given packet in the response data (the processes in steps S1501 to S1511), if data of the next packet to be included in the response data is separated a plurality of packets from the packet indicated by the pointer, the value of B_mng[bx].number does not match that indicated by the variable px.

Hence, in such case, it is checked in step S1512 if the value indicated by the variable px matches that indicated by B_mng [bx].same (step S1512). That is, it is determined if the packet to be included in the response data is the head one of a precinct data-bin to which this packet belongs (step S1512). If that packet is not the head one, the flow jumps to step S1515 to execute the aforementioned process.

On the other hand, if that packet is the head one, the flow advances to step S1513, "the data length plen of the packet with the packet sequence number=px" acquired in step S1505 is added to the value held in B_mng[bx].offset (step S1513). Furthermore, "the packet sequence number of a packet located next to the packet of B_mng[bx].same in the precinct data-bin having B_mng[bx].same, i.e., a packet of a layer one level higher than the packet of B_mng[bx].same (in this embodiment, since the progression order is LRCP, that packet sequence number can be calculated by adding R_num× C_num×P_num to the value indicated by B_mng[bx].same)" is substituted in B_mng[bx].same (step S1514). In this way, B_mng[bx].offset finally stores the offset value of the (bx)-th transmission packet from the head of the precinct data-bin.

As described above, according to this embodiment, the server can acquire the progression order used on the client terminal side with reference to the history of data requested from this client terminal, and changes the arrangement of data to be transmitted to this client terminal in accordance with the acquired progression order. Hence, the load on the client terminal that received the data upon decoding can be reduced, and the processing time of an image output process such as an image display process and the like can be consequently shortened.

The server side calculates the packet sequence numbers of data to be transmitted and those of packets which belong to the same precinct data-bin before it actually extracts transmission data. Hence, the server can easily acquire information required for the message header while searching packet data from the head of the tile upon extracting packet data in the order of transmission data, and can minimize unwanted pointer movements. In this way, the response time of the server can be shortened.

Second Embodiment

In the first embodiment, the progression order used on the client terminal side is LRCP. However, even when other progression orders are adopted, basically the same process can be applied by modifying the first embodiment accordingly. Only processes different from those in the first embodiment when the progression order used on the client terminal side is other than LRCP will be explained below.

Figure 15:
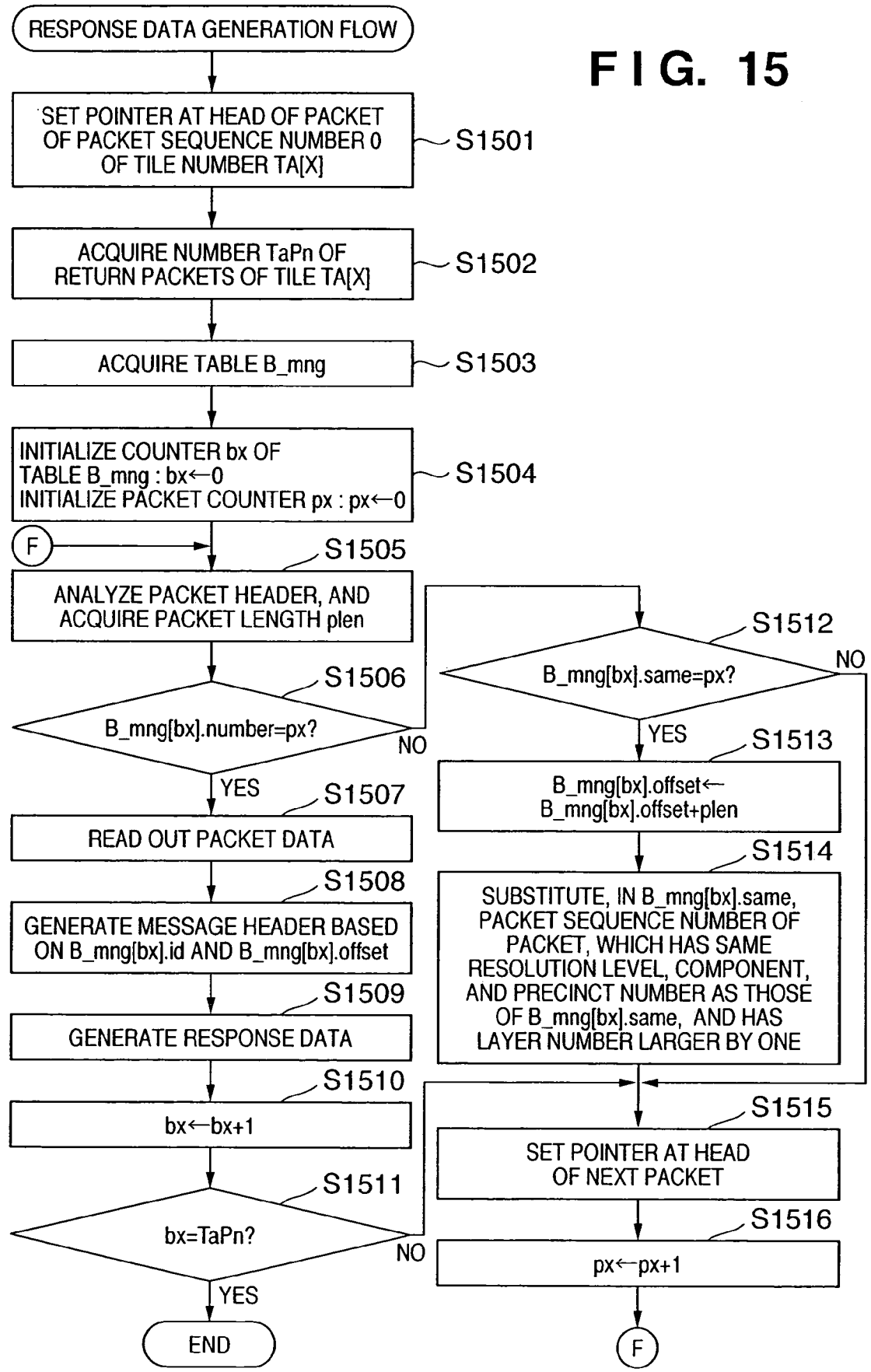
FIG. 15 is a flowchart showing details of the process in step S1310, i.e., a process for generating response data to be transmitted to a client terminal.

When the progression order used on the client terminal side is each of RLCP, RPCL, PCRL, and CPRL, the equation used to calculate the packet sequence number and the equation used to update B_mng[bx].same in step S1514 in FIG. 15 are different from those in the first embodiment, and the following equations are used.

In case of RLCP $$\text{Packet}(t, r, c, p, q) = p + c \times P\text{num} + q \times C\text{num} \times P\text{num} + r \times L\text{num} \times C\text{num} \times P\text{num}$$

$$B\_mng[bx].same \leftarrow B\_mng[bx].same + C\text{num} \times P\text{num}$$

In case of RPCL $$\text{Packet}(t, r, c, p, q) = q + c \times L\text{num} \times p \times C\text{num} \times L\text{num} + r \times P\text{num} \times C\text{num} \times L\text{num}$$

$$B\_mng[bx].same \leftarrow B\_mng[bx].same + C\text{num} \times L\text{num}$$

In case of PCRL $$\text{Packet}(t, r, c, p, q) = q + r \times L\text{num} + c \times R\text{num} \times L\text{num} + p \times C\text{num} \times R\text{num} \times L\text{num}$$

$$B\_mng[bx].same \leftarrow B\_mng[bx].same + 1$$

In case of CPRL $$\text{Packet}(t, r, c, p, q) = q + r \times L\text{num} + p \times R\text{num} \times L\text{num} + c \times P\text{num} \times R\text{num} \times L\text{num}$$

$$B\_mng[bx].same \leftarrow B\_mng[bx].same + 1$$

where $P\text{num}$=the number of positions per tile $C\text{num}$=the number of components $R\text{num}$=the number of resolution levels $L\text{num}$=the number of layers Furthermore, in the first embodiment, one of RLCP and LRCP is determined as the transmission order in step S1303. However, other progression orders may be selected. For example, when the client requests only Y component data of an image having YCbCr components first, the server selects return of that data in the progression order of CPRL. When the return progression order selected by the server is different from that in the first embodiment, the processing order of the loop is changed accordingly.

When the transmission order is LRCP, the loop associated with layer and that associated with resolution level in FIG. 14 may be replaced.

That is, variables r, Rmin, and Rmax may be respectively replaced by variables q, Lmin, and Lmax, and variables q, Lmin, and Lmax may be respectively replaced by variables r, Rmin, and Rmax.

When the transmission order is RPCL, the loop associated with layer and that associated with position in FIG. 14 may be replaced.

That is, variables q, Lmin, and Lmax may be respectively replaced by variables p, Pmin, and Pmax, and variables p, Pmin, and Pmax may be respectively replaced by variables q, Lmin, and Lmax.

When the transmission order is PCRL, likewise in FIG. 14, variables r, Rmin, and Rmax may be respectively replaced by variables p, Pmin, and Pmax, variables q, Lmin, and Lmax may be respectively replaced by variables c, Cmin, and Cmax, variables c, Cmin, and Cmax may be respectively replaced by variables r, Rmin, and Rmax, and variables p, Pmin, and Pmax may be respectively replaced by variables q, Lmin, and Lmax.

When the transmission order is CPRL, variables r, Rmin, and Rmax may be respectively replaced by variables c, Cmin, and Cmax, variables q, Lmin, and Lmax may be respectively replaced by variables p, Pmin, and Pmax, variables c, Cmin, and Cmax may be respectively replaced by variables r, Rmin, and Rmax, and variables p, Pmin, and Pmax may be respectively replaced by variables q, Lmin, and Lmax.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores the program codes corresponding to the aforementioned flowcharts.

As many apparently widely different embodiments of the present invention can be made without departing from the spirit and scope thereof, it is to be understood that the invention is not limited to the specific embodiments thereof except as defined in the claims.

What is claimed is:

1. An image processing method to be executed by an image processing apparatus that holds JPEG 2000 encoded image data, in which the data is segmented into tiles each including a plurality of logical units and has a format that allows a plurality of types of different orders of logical units to be arranged and that transmits data of a logical unit designated by a request from an external apparatus in a tile designated by that request to the external apparatus, comprising:

using the image processing apparatus to perform steps including:

a history holding step of holding information representing data of a logical unit first transmitted to the external apparatus in response to a request from the external apparatus as a history;

a reception step of receiving, from the external apparatus, a transmission request of data of logical units, of the held JPEG 2000 encoded image data, required to obtain a desired image;

an acquisition step of analyzing the received transmission request to acquire data of logical units required by the external apparatus from the held JPEG 2000 encoded image data;

a determination step of, upon receiving the transmission request in the reception step, analyzing the held history to determine whether or not the transmission request received from the external apparatus in the reception step is a transmission request of data of Layer O:

a first transmission step of, when it is determined in the determination step that the transmission request is data of Layer O, determining that a type of progression order used on the external apparatus side is Layer-Resolution-Component-Position and transmitting the data of logical units acquired in the acquisition step as response data to the external apparatus in order of Layer-Resolution-Component-Position;

a second transmission step of, when it is determined in the determination step that the transmission request is not data of Layer O but of color component Y, determining that a type of progression order used on the external apparatus side is Component-Position-Resolution-Layer and transmitting the data of logical units acquired in the acquisition step as response data to the external apparatus in order of Component-Position-Resolution-Layer; and a third transmission step of, when it is determined in the determination step that the transmission request is data other than both data of Layer O and data of color component Y, determining that a type of progression order used on the external apparatus side is Resolution-Layer-Component-Position and transmitting the data of logical units acquired in the acquisition step as response data to the external apparatus in order of Resolution-Layer-Component-Position.

2. An image processing apparatus that holds JPEG 2000 encoded image data, in which the data is segmented into tiles each including a plurality of logical units and has a format that allows a plurality of types of different orders of logical units to be arranged, and that transmits data of a logical unit designated by a request from an external apparatus in a tile designated by that request to the external apparatus, using the image processing apparatus to perform the steps of:

a history holding means for holding information representing data of a logical unit first transmitted to the external apparatus in response to a request from the external apparatus as a history;

a reception step of receiving, from the external apparatus, a transmission request of data of logical units, of the held JPEG 2000 encoded image data, required to obtain a desired image;

an acquisition step of analyzing the received transmission request to acquire data of logical units required by the external apparatus from the held JPEG 2000 encoded image data;

a determination step of, upon receiving the transmission request in the reception step, analyzing the held history to determine whether or not the transmission request received from the external apparatus in the reception step is a transmission request of data of Layer O;

a first transmission step of, when it is determined in the determination step that the transmission request is data of Layer O, determining that a type of progression order used on the external apparatus side is Layer-Resolution-Component-Position and transmitting the data of logical units acquired in the acquisition step as response data to the external apparatus in order of Layer-Resolution-Component-Position;

a second transmission step of, when it is determined in the determination step that the transmission request is not data of Layer O but of color component Y, determining that a type of progression order used on the external apparatus side is Component-Position-Resolution-Layer and transmitting the data of logical units acquired in the acquisition step as response data to the external apparatus in order of Component-Position-Resolution-Layer; and a third transmission step of, when it is determined in the determination step that the transmission request is data other than both data of Layer O and data of color component Y, determining that a type of progression order used on the external apparatus side is Resolution-Layer-Component-Position and transmitting the data of logical units acquired in the acquisition step as response data to the external apparatus in order of Resolution-Layer-Component-Position.

3. A system including an image processing apparatus of claim 2.

4. A computer readable storage medium storing a program for making a computer execute an image processing method of claim 1.

* * * * *